INVENTORS
RICHARD D. VELTRI
JOHN E. COX

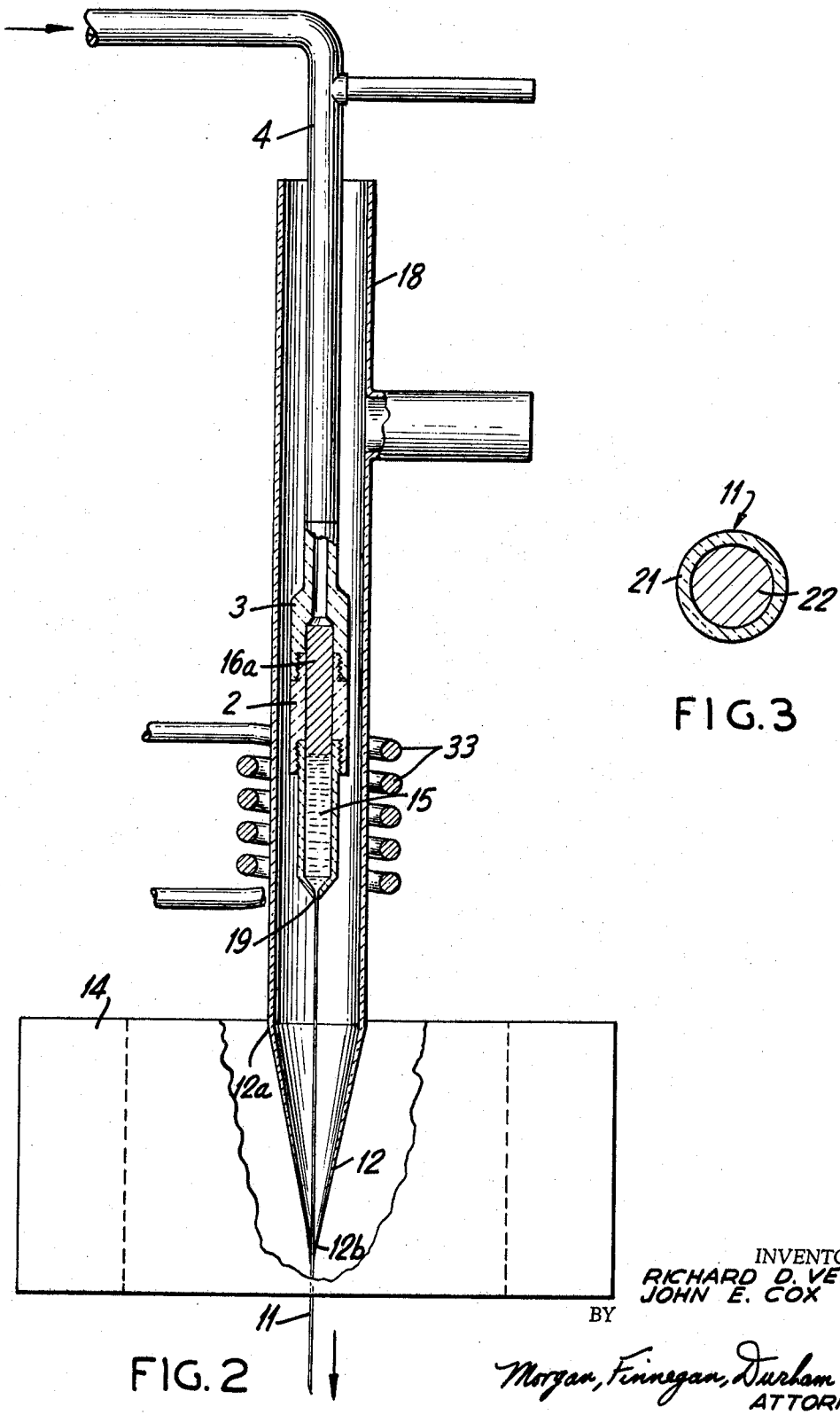

United States Patent Office 3,481,390
Patented Dec. 2, 1969

3,481,390
PROCESS FOR MAKING COMPOSITE FIBERS
Richard D. Veltri, East Hartford, and John E. Cox, Glastonbury, Conn., assignors to United Aircraft Corporation, East Hartford, Conn., a corporation of Delaware
Filed May 2, 1966, Ser. No. 546,934
Int. Cl. B22d 11/00; C03b 37/00
U.S. Cl. 164—86                     19 Claims

ABSTRACT OF THE DISCLOSURE

A process for preparing composite metal fibers and filaments containing a protective coating, wherein said metal and protective coating are reactive under conditions at which the composite fiber is formed comprising maintaining the residence time at which said metal and coating are molten and in contact and reactive at less than 0.5 to 0.002 second, whereby reaction between said metal and protective coating is substantially eliminated by maintaining said molten metal out of contact with said molten protective coating material until just before said composite fiber is formed, and the composite fibers and filaments formed by said process.

---

Figure 1:
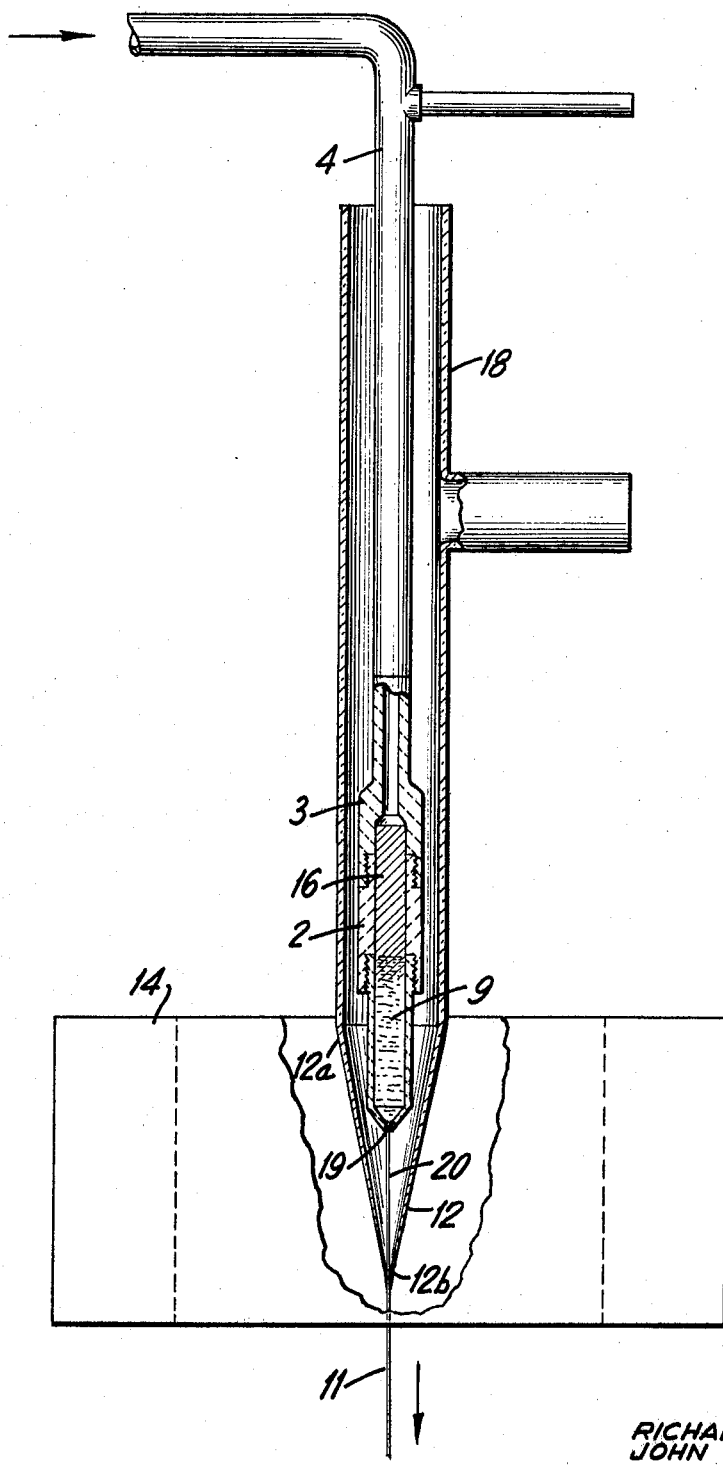

The present invention relates to a process for forming metal fibers and filaments. The present invention relates to a process for continuously casting metal fibers and filaments. The present invention relates to a process for forming a protective glass or plastic coating on metal filaments.

The invention relates to a process for continuously casting metal fibers in a glass sheath and drawing a composite fiber having a metal core and an outer glass coating.

The invention relates to melting glass and drawing the molten glass until it comes together to form a cone of molten glass and drawing the molten glass into a fiber.

More specifically, the present invention relates to an improved process for the continuous casting of metal fibers from highly reactive molten metals by injecting a molten metal stream into the apex of a fiber forming cone of molten glass as the glass is being drawn into a fiber.

The invention relates to an improved process for forming protective coatings on metal cores while maintaining at a minimum the period of time at which the metal and coating are in contact with each other in the molten state. Limiting the period of contact minimizes any deleterious effects that can occur to the glass, while in contact with the metal at a high temperature for too long a period, and also minimizes any chemical reaction that can take place between the glass and metal.

The invention specifically relates to a process of forming a composite fiber comprising an inner core of a reactive metal and an outer coating of glass which comprises contacting the molten metal and molten glass under conditions whereby there is substantially no chemical reaction between the metal and glass.

The process of this invention consists essentially of heating the protective coating material, e.g. glass, to a temperature at which it can be drawn into a fiber, thus forming a cone of molten material flowing downward through the heating zone and coming together to form an apex from which the fiber is drawn. The coating material after passing through the apex forms the fiber and hardens.

The metal is heated out of contact with the molten glass and the molten metal ejected under pressure to form a fine stream of molten metal which is directed into the apex of the fiber forming cone of the protective coating glass material.

Immediately, after the molten metal and protective material pass through the apex and harden into the fiber, they are chemically unreactive.

The molten metal therefore contacts the molten protective material, e.g. glass, for only a fraction of a second before the metal and glass become hard and unreactive. The glass is moving very rapidly at the apex and rapidly cools and solidifies, forming the fiber coating.

In this manner, the molten metal is maintained out of contact with the molten glass until the last possible moment before fiber formation. The time which the molten metal and molten glass are in contact with each other and the time which they could chemically react is greatly minimized.

More specifically, the present invention is directed to a procedure for accurately controlling the period of time, and minimizing that time, in which molten metal and molten glass which are being formed into a composite fiber are in contact with each other.

The process of this invention has made it possible for the first time to form filaments of highly reactive metals as well as filaments from high melting temperature metals which have a protective coating.

The term "filament" as used herein is intended to include fiber.

The term "reactive metal" is intended to include those metals which react with glass and/or other protective coating materials at the temperatures at which both are molten.

In prior art procedures low temperature non-reactive metals can be drawn into metal fibers sheathed in glass.

In the prior art process the low melting temperature wire is placed in a glass tube. The wire and the glass are melted in the heating zone and the molten metal wire and molten glass are in contact throughout the cone forming portion of the glass tube. This requires a contact time of at least 30–60 seconds.

Though low melting, e.g. 800° C. non-reactive metals can be coated with glass in this manner, highly reactive low melting temperature metals cannot be coated in this manner. The high melting temperature metals, most of which are inherently highly reactive, also cannot be coated in this manner.

The primary difficulty of the prior art procedure is that the molten metal remains in contact with the molten glass, at temperatures and conditions, for a sufficient period of time for the reactive metals to react with the glass and change the physical characteristics of the metal and the glass. Also, at the high temperatures needed to melt high melting temperature metals the glass would generally have to be heated to a temperature at which it readily flowed, and the metal would break out of the glass coating or the glass would be heated to a temperature at which it would not attenuate into a fiber, i.e. the fiber would break.

In the prior art process as the glass and the metal melt they are continuously in contact throughout the length of the fiber forming cone of the glass tube in the heating zone. For reactive metals, this technique is of substantially no value because the metals rapidly react with the $SiO_2$ in the glass to form the corresponding metal oxide. The reaction reduces the glass to a sheath of non-viscous oxide and silicon which cannot be drawn into a fiber. The period of contact of the molten glass and molten metal even if as low as 60 seconds is sufficient to carry out this reaction and to decompose the glass and prevent fiber formation. Therefore, there are two major problems, one of coating high melting metals with glass where the glass becomes too fluid and cannot be drawn into a fiber, and two to coat metals with glass where the metals react with the glass to form reaction products which cannot be drawn into fibers.

The prior art procedures have been limited therefore to coating metals which are non-reactive and metals which have about the same melting temperature as the glass.

The process of the present invention allows continuous casting of high melting temperature metals and highly reactive metals in a glass or plastic protective sheath. The present invention contemplates the use of a separate container for the metal to be melted. The container for the molten metal is maintained out of contact with the glass and so arranged that a stream of molten metal can be ejected under pressure and made to flow downward from an extrusion nozzle. Surrounding the metal container and extrusion nozzle is a glass column, the bottom portion of which is heated in a heating zone and drawn into a fiber forming a cone. The fiber is drawn from the apex of the cone. The molten metal stream is directed into the apex of the cone and forms an inner core of the composite fiber enclosed in a glass sheath.

The molten glass as it moves downward in the fiber forming cone gradually increases its downward velocity. The glass moves relatively slowly until it reaches the apex of the cone; at this point, the glass comes together and forms the fiber and its velocity or downward movement is greatly increased. By keeping the molten metal out of contact with the molten glass until the last possible instant before fiber formation the metal is contacted with the glass at the instant its velocity greatly increases and at the time just before it begins to rapidly cool. In this manner, the time in which a reaction can take place between the metal and glass is greatly minimized since immediately after contact of the molten metal and molten glass at the apex of the cone the metal and glass rapidly move out of the heating zone and both are rapidly cooled to a temperature below which they chemically react.

In accordance with the present process the glass is melted in a heating zone and attenuated into a fiber. In the heating zone where the glass becomes molten the glass tube from which the fiber is drawn forms a cone, the apex of which is the point that the fiber actually forms, and after the glass passes through the apex it cools and hardens. The fiber forms either just before leaving the heating zone or just after leaving the heating zone, depending on the melting temperature of the glass and the rate at which the glass is pulled into a fiber. The length of the fiber forming cone depends on the melting temperature of the glass, the temperature at which it is melted, effects viscosity, and the rate at which the glass is drawn into the fiber. In accordance with the present invention the metal, as distinguished from the prior art technique, is melted out of contact with the glass and squirted downward into the apex of the fiber forming cone at about the same rate as the glass is drawn into a fiber. In this manner the period of time which the molten glass is in contact with the molten metal is greatly minimized, since at the apex the glass is quickly pulled out of the heating zone by the fiber as it forms and is rapidly cooled. Since the total mass of the composite fiber, i.e., metal and glass, is extremely small the rate of cooling is very rapid.

The time in which glass could react with metal can be reduced to as little as .002 second or less, thereby substantially preventing chemical reaction even between highly reactive metals and glass.

The molten metal is maintained out of contact with the molten glass until the last possible moment at which contact can be made and a glass enclosed metal fiber still formed.

The molten metal hits the apex flowing downward at about the same rate as the glass is drawn from the apex into a fiber and is pulled rapidly away from the apex of the fiber forming cone.

The process of this invention can be used to form composite filaments containing a core of a reactive metal and an outer sheath of protective material such as glass or high melting plastic. The process can also be used to form protective coatings of relatively low melting glass for high melting metals.

Where the metal to be enclosed in glass melts at about the same temperature as the glass, they can be heated by the same heating means. Where the metal melts at a temperature substantially higher than the temperature of the glass, then the metal is separately heated by a means which does not heat the glass, for example, and R.F. induction heating means. Both the molten metal and the molten glass as they are removed from their respective and/or the same heating means because of their extremely small mass are rapidly cooled and subsequently harden. For example, the molten glass attenuates to form a fiber at about a point in the immediate vicinity of the end of the glass heating means. This will vary somewhat depending on the temperature to which the glass is heated and the rate at which the glass is attenuated into the fiber. The molten metal will rapidly cool a short distance after it leaves the extrusion nozzle. The process is carried out under conditions so that the glass will harden at about the same time as the metal or will harden before the metal and thus form a continuous mold in which the molten metal is cast into a filament.

The metals that can be formed into filaments in accordance with the present invention include those metals which are considered to be low melting temperature metals which will melt in a temperature range of 200° C. to about 1500° C. Metals that fall into this category are beryllium, aluminum, silicon, tin, gold and copper. These metals have the following melting point temperatures:

|  | ° C. |
| --- | --- |
| Tin | 230 |
| Aluminum | 660 |
| Gold | 1063 |
| Copper | 1083 |
| Beryllium | 1285 |
| Silicon | 1410 |

High melting temperature metals are those that melt at temperatures of 1500° C. to 2800° C. Examples of these metals are boron, chrome and molybdenum. These metals melt at about the following temperatures:

|  | ° C. |
| --- | --- |
| Boron | 2085 |
| Chrome | 1875 |
| Molybdenum | 2620 |

Protective coating materials that can be used to coat the molten metal are materials which melt at about the temperature the metal is at when the molten metal stream contacts the protective material. Glass materials such as pure silica glass, Pyrex glass, borosilicate, aluminosilicate glass and other non-silica base glasses such as fluoborate, fluoride and the rare earth type can be employed.

High melting point materials such as polyethylene, polyamide or acrylic plastics can be used. Examples of protective materials that can be used have melting points within the following temperature ranges 300° C. and 2000° C.

Where the metals and the glass are selected so that they melt at about the same temperature the distance between the nozzle from which the molten metal stream is ejected and the apex of the fiber forming cone will be relatively short since the molten metal and the molten glass should be at about the same temperature when the glass and metal are attenuated and drawn into the composite fiber. The glass being on the outside of the metal generally cools more rapidly and hardens first. The difference in temperature of the glass and molten metal when they are contacted can be as high as plus or minus 100° C. Preferably, however, the molten metal and glass are at about the same temperature when they come into contact with each other.

The metals can be heated to temperatures of up to 2800° C. Generally, the metals are heated to temperatures of from about their melting point to temperatures several hundred degrees above their melting point. Where glass is used to form the protective coating, and is used with the low melting metals, the glass can be selected to melt at about the same temperature as the metals, for example, 1000° C. to 2000° C. Where glass is used to coat the high melting metals a lower temperature glass may be selected which can be heated to temperatures of from 1500° C. to 2000° C.

Where a high temperature metal which melts in a range of 1800° C. to 2800° C. is melted, a glass melting in a range of 1400° C. to 2000° C. can be used. In the latter case, the nozzle from which the metal stream is ejected can be placed at a point sufficiently removed from the apex of the fiber forming cone so that the metal stream will cool a sufficient amount so that when it comes into contact with the molten glass they will be at about the same temperature and/or will not differ in temperature by more than 100° C.

Depending on the metal used, the temperature to which it is heated and the desired diameter of the metal filament, the orifice forming the metal stream can be 0.001 inch to 0.135 inch diameter; generally the orifice will be 0.001 to 0.006 inch and more generally the orifice can be 0.004 to 0.006 inch diameter. Where a glass cylinder is used to form the protective coating the inside diameter of the cylinder will be sufficiently large to maintain the glass out of contact with the container containing the molten metal and sufficiently removed from the container to prevent premature radiant heating of the glass.

The thickness of the protective sheath will vary with the temperature to which the protective material, for example, glass, is heated relative to the glass melting temperature and to the rate at which the material is attenuated into a fiber. The protective coating can vary in thickness between 0.0005 to 0.0500 inch and generally can be 0.001 to 0.010 inch thickness.

The velocity at which the protective material is attenuated into a fiber is controlled so that it is at about the same velocity of the molten metal stream contacting the metal, at the apex of the fiber forming cone, so that the fiber forming material pulls the molten metal along with it as it forms a fiber. Suitable glass cylinder material for attenuation into fibers can have an inside diameter of 8 mm. and an outside diameter of 10 mm. giving a wall thickness of 1 mm. The protective materials, for example, glass, attenuate into a fiber at a ratio of about 2000 feet to 80,000 feet of fiber per foot of glass cylinder. This illustrates the order of magnitude of the increase in the velocity of the molten glass as it, for example, proceeds from the wall of the glass cylinder at zero downward velocity down to the fiber forming cone, through the apex of the cone forming the fiber into the fiber being drawn. The rate of fiber formation can vary between 35 feet per minute and about 2000 feet per minute, depending on the temperatures being used, the metals being coated, the coating material, and the desired diameter of the metals and thickness of the coating. Generally, the higher the rate of the fiber formation, the longer the length of the fiber forming cone and the shorter the residence time at the temperatures the metal and the glass are molten and therefore, the time that a possible reaction can occur between the metal and coating.

The distance between the nozzle from which the molten metal is extruded and the apex of the fiber forming cone can be about 1–6 inches. This distance allows considerable flexibility in the separate heating of the molten metal, e.g. to a temperature higher than the temperature of the molten glass, and allows sufficient time for the molten metal to be cooled to about the temperature of the molten glass before they are contacted. The initial melting temperature difference between the molten glass and molten metal used can be as high as 100° C. to 1000° C. This difference will depend on the metal being heated and the diameter of the metal being extruded which affect the rate at which it would be cooled after leaving the metal heating zone and before contacting the glass coating material.

The process of this invention is preferably carried out so that the cross-sectional area of the metal stream after it hardens will be about the same as the cross-sectional area of the protective coating material after it hardens. The diameter and velocity of the molten metal stream and the thickness of the glass and the rate at which it is attenuated into a fiber can be adjusted so that the time the metal and glass are at conditions or temperatures at which they can react can be substantially reduced and minimized. The time or the period at which the materials can be contacted without adverse effect can be maintained at 0.002 second to 0.5 second. This time will vary with the reactivity of the metal being treated and for the more highly reactive materials can be maintained at less than 0.010 second and preferably at one less than 0.005 second. More generally the contact time will be controlled between 0.005 to 0.010 second.

The metal is heated in a high temperature refractory material container having a suitable nozzle. The nozzle can be made of boron nitride and the container can also be made of boron nitride. Other thermally compatible materials such as beryllium oxide and aluminum oxide can be used. Any suitable furnace can be used to heat the metal and protective coating material, and where the metal is to be separately heated to a temperature to which the protective material cannot be heated an R.F. induction heating furnace can be used to separately heat the metal.

A suitable radio frequency induction heater is one that operates at 450 kc. and can be of a conventional type. Preferably, the container in which the metal is heated is non-conductive and not heated by the induction heating furnace.

The invention may be better understood with reference to the accompanying drawings. FIGURE 1 of the drawings illustrates an embodiment of the invention wherein a reactant metal is continuously cast into a composite fiber enclosed in a protective glass sheath. In this embodiment metal and fiber are simultaneously heated to about the same temperature but are heated out of contact with each other.

FIGURE 2 of the drawings schematically illustrates an embodiment of the invention wherein the metal is separately heated by induction heating to a temperature substantially higher than the temperature to which the glass is heated.

FIGURE 3 of the drawings shows a cross-section of a composite filament formed in accordance with the present invention.

An embodiment of the invention is described with reference to FIGURE 1 of the drawings. A low temperature reactant metal 16 is placed in a boron nitride container 3 which is connected to a boron nitride adaptor 2 which forms the lower portion of the container. The metal is in a solid form in the container 16. Where the adaptor 2 is within the hot zone of a heating means 14, the metal 9 is melted. Orifice opening 19 is about 0.005 inch diameter and a gas pressure of about 10 lbs. per sq. inch is applied through connecting means 4. The molten metal 9 is squirted out forming a fine stream of molten metal 20 of about 0.005 inch diameter. This stream velocity is adjusted to about 200 feet per minute. The heating means 14 heats both the metal and the glass tube 18 to a temperature of about 1200° C., at which they both melt. The portion of the glass tube within the hot zone is drawn downward and is gradually restricted in diameter making the fiber forming cone 12. The glass becomes melted at about 12a, and proceeds downward to 12b, 12b being the apex of the cone. The molten metal stream 20 is directed to the apex of the cone 12b and is immediately pulled out of the hot zone with the glass. The glass rapidly cools forming a hardened fiber 11, completely enclosing a rapidly cooling and hardening metal stream. The fiber is attenuated at a rate of about 200 feet per minute which coincides with the downward velocity of the molten metal stream. The reaction time or the period of time at which the molten metal is in contact with the molten glass is in this manner controlled below about 0.005 second thereby preventing any significant amount of chemical reaction between the molten metal and the glass.

In another embodiment of the present invention which will be discussed with reference to FIGURE 2 of the drawings a high melting and a highly reactive metal is formed into a fiber having a protective glass sheath. A metal 16a, which melts at 2400° C. is placed in a boron nitride container 3 which is attached to a boron nitride adaptor 2 which has a nozzle orifice 19 of 0.005 inch. The container is placed within an R.F. induction heating means 33 and heated to a temperature of about 2400° C. to melt the metal at 15. The molten metal is squirted out through nozzle 19 at a rate of about 170 feet per minute and has a diameter of about 0.005 inch. Following the induction heating means is a second heating means 14. The temperature in this heating zone is maintained at about 2000° C. The high melting temperature silica glass cylinder 18 surrounds the boron nitride container 3 and protrudes into the second heating zone 14. Because of the nature of R.F. induction heating the glass column surrounding the boron nitride container is not heated. The glass column protruding into the second heating zone however is heated to a temperature of about 2000° C. The glass is drawn into a fiber and forms a fiber forming cone between points 12a and 12b. The distance between the orifice nozzle 19 and the apex of fiber forming cone 12b is controlled at about 4 inches to allow the molten metal stream to cool from a temperature of about 2400° C. to about 2000° C. The glass is attenuated into a fiber at about 170 feet per minute, i.e., about the same velocity of the molten metal stream. A composite fiber 11 containing the hardened metal stream completely enclosed in a protective glass sheath is obtained.

FIGURE 3 of the drawings shows a cross-section of the composite filament 11 wherein 21 is the outer protective sheath of glass and 22 is the hardened metal core.

The process of this invention can be used to form metal fibers or filaments from metals that were heretofore considered too reactive to be made into metal filaments. The metal filaments obtained can be used with the glass sheath which in the thicknesses applied form filaments which are flexible and can be easily wound into wide coils. Alternatively, the glass can be stripped from the metal and the metal itself used without the glass coating.

The composite filaments can be used to form high strength, high temperature resistant, structural materials and/or certain filaments can be used to form micro-circuit connecting means. The process can be used to form chrome or beryllium wires of 0.002 to 0.005 inch diameter. Copper wires suitable for use with micro-circuitry of 5 to 10 microns diameter can be made having a 5 to 10 micron insulating glass cover.

The invention is further illustrated by the following examples:

EXAMPLE 1

Iron is drawn into a glass covered fiber by heating to a temperature of 1550° C. to 1560° C. A suitable glass Pyrex material melting at about 1500° C. to 1550° C. is used to form the coating. The glass cylinder has an inside diameter of 8 mm. and an outside diameter of 10 mm. A refractory material having an orifice of 0.0015 inch is used to produce the molten metal stream. The iron is ejected under pressure in a molten stream of 0.0015 inch diameter at a rate of 800 feet per minute. The glass is attenuated into a fiber at about the same rate, i.e. of 800 feet per minute. The molten iron stream is contacted with the glass at the apex of the fiber forming glass cone. The orifice nozzle is maintained at a distance above the apex of about two inches. The iron and glass are at about the same temperature when they come into contact. The composite fiber has an iron core of 0.0015 inch and has an outside coating of a glass sheath of 0.0028 inch diameter.

EXAMPLE 2

In a similar manner, boron is extruded into a fine boron filament. The boron is heated by induction heating to 2100° C. to 2200° C. A silica glass is selected and is heated by a separate heating means to 1800° C. to 2000° C. The glass is attenuated into a fiber at a rate of 200 feet per minute and a molten boron metal stream is squirted at the apex of the glass fiber forming cone at about 200 feet per minute. The distance of the nozzle, from which the molten boron is squirted, to the apex of the molten glass cone is controlled at about 3 to 5 inches thereby allowing the molten boron stream to cool to about 1900° C. prior to contact with the molten glass.

A composite fiber having a boron metal core of 0.003 inch diameter and having an outside coating consisting of a glass silica protective sheath of 0.0015 inch thickness is obtained.

EXAMPLE 3

In another example of the present invention, copper is heated to a temperature of 1080° C. to 1100° C. to form molten copper and is ejected through a nozzle of 0.01 to 0.03 inch diameter. The Pyrex glass cylinder has an inside diameter of 8 mm. and outside diameter of 10 mm. The Pyrex glass is heated to a temperature of 1050° C. to 1100° C. and is drawn into a glass fiber; the apex of the fiber forming cone is adjusted to a distance of 2½ inches from the nozzle orifice. The molten copper is ejected at a velocity of 174 feet per minute and the glass is attenuated into a fiber at about the same velocity. The metal-glass filament is further attenuated to produce a composite filament having an inner copper core of 0.003 inch and an outside diameter including the glass sheath of about 0.0065 inch diameter.

EXAMPLE 4

In a manner similar to the process carried out in the above examples, beryllium is formed into composite fiber, using both the low temperature process and the high temperature process.

(a) Beryllium is heated to a temperature of 1280° C. to 1290° C. in a heating zone containing Pyrex glass which is heated to about the same temperature. The Pyrex glass is attenuated into a fiber, the apex of which fiber forming cone is adjusted to a distance of 1.5 inches below the orifice from which the molten beryllium is ejected. The molten metal stream is ejected at about a rate of 300 feet per minute and the fiber is attenuated at about the same rate. The beryllium composite fiber has a metal core diameter of 0.004 inch and is enclosed in a glass sheath of .001 inch thickness.

(b) In this example, beryllium is heated to a temperature of 1400° C. to 1600° C. by induction heating means. The glass is heated in a separate heating zone to a temperature of 1200° C. to 1250° C. and the glass is attenuated into a fiber. The orifice nozzle from which the beryllium is ejected is adjusted to a distance of 5 to 6 inches from the apex of the fiber forming cone. The molten beryllium stream rapidly cools, from about 1400° C. to 1600° C., to within plus or minus 100° C. of the temperature of the molten glass at the apex where they are contacted. The glass is attenuated to a fiber at a rate of about 1000 feet per minute and beryllium metal stream is ejected at about the same rate. A composite filament having an inner beryllium core of 0.002 inch and an outside diameter of 0.004 inch is obtained.

The foregoing description and specific examples are not intended as limitations of the invention but are to be considered as being merely illustrative. Many variations and modifications of the present invention which will occur to those skilled in the art are considered to come within the scope of the invention.

What is claimed is:

1. A process for forming a composite fiber containing a reactive protective coating material on a reactive metal which comprises melting the metal and extruding a stream of molten metal under pressure, maintaining around said stream a cylinder of the material which is to form the protective coating, heating said material and drawing the molten material into a fiber so as to form an apex at the point where the fiber is formed, continuously drawing said protective material into a fiber, introducing said molten stream of metal, from a point out of contact with said protective material, into the apex of said protective material, continuously coating said molten metal stream with said molten protective material, continuously drawing a composite fiber containing a center core of molten metal and an outer covering of protective material at a rate at which the period of time of contact during which said metal and said protective material are molten and in contact and reactive is about 0.5 to 0.002 second, whereby substantially no reaction takes place between said metal and said protective material and cooling said molten metal and said outer covering to solidify said metal core and outer covering.

2. The process of claim 1 wherein the temperature at which the metal and protective material are melted is in the range of 300° C. to 2800° C.

3. The process of claim 1 wherein the molten metal is highly reactive.

4. The process of claim 3 wherein the protective material is glass.

5. The process of claim 1 wherein the period of time at which said metal and said protective coating are molten and in contact and reactive is maintained at less than 0.1 second.

6. The process of claim 1 wherein the protective material is drawn into a fiber at the rate of 100 to 2000 feet per minute.

7. A process for forming a composite fiber containing a reactive protective coating material on a reactive metal which comprises melting a high melting temperature metal in a heating zone at a high temperature without melting said protective material, extruding a stream of said molten metal under pressure, maintaining around said extruded stream a cylinder of the material which is to form the protective coating, passing said protective coating material into a second heating zone, melting said material in said second heating zone at a lower temperature to a temperature sufficient to draw said material into a fiber and drawing it into a fiber so as to form an apex at the point where the fiber is formed, continuously drawing said protective material into a fiber, introducing said molten metal stream from a point out of contact with said protective material, into said apex of the protective material, continuously coating the molten stream with the protective material, continuously drawing a fiber containing a center core of molten metal and an outer covering of protective material at a rate at which the period of time of contact during which said metal and said protective material are molten and in contact and reactive is about 0.5 to 0.002 second, whereby substantially no reaction takes place between said metal and said protective material and cooling said molten metal and said outer covering to solidify said metal core and outer covering.

8. The process of claim 7 wherein the metal is heated to a temperature in the range of about 2000° to 2800° C. and said protective material is heated to a temperature in the range of 1400° C. to 2000° C.

9. The process of claim 7 wherein the molten metal is highly reactive.

10. The process of claim 7 wherein the protective material is glass.

11. The process of claim 7 wherein the period of time at the temperature at which the two materials can react is maintained at less than 0.010 second.

12. The process of claim 7 wherein the protective material is drawn into a fiber at the rate of 200–1000 feet per minute.

13. The process of claim 1 wherein the period of time during which said metal and said protective coating material are molten and in contact and reactive is about 0.010 to 0.002 second.

14. The process of claim 7 wherein the period of time during which said metal and said protective coating material are molten and in contact and reactive is about 0.010 to 0.002 second.

15. A process for forming a composite fiber containing a reactive protective coating material on a reactive metal selected from the group consisting of tin, aluminum, gold, copper, beryllium and silicon which comprises melting the metal and extruding a stream of molten metal under pressure, maintaining around said stream a cylinder of the material which is to form the protective coating, heating said material and drawing the molten material into a fiber so as to form an apex at the point where the fiber is formed, introducing said molten stream of metal, from a point out of contact with said protective material, into the apex of said protective material, said apex being about 1 to 6 inches from the point at which the molten metal is extruded, continuously drawing said protective material into a fiber, continuously coating said molten metal stream with said molten protective material, continuously drawing a composite fiber containing a center core of molten metal and an outer covering of protective material at a rate at which the period of time of contact during which said metal and said protective material are molten and in contact and reactive is about 0.5 to 0.002 second, whereby substantially no reaction takes place between said metal and said protective material and cooling said molten metal and said outer covering to solidify said metal core and outer covering.

16. The process of claim 15 wherein said reactive metal consists of boron.

17. The process of claim 15 wherein said reactive metal consists of beryllium.

18. A process for forming a composite fiber containing a reactive protective coating material on a reactive metal selected from the group consisting of boron, chrome and molybdenum which comprises melting said metal at a high temperature in a heating zone without melting said protective material, extruding a stream of said molten metal under pressure, maintaining around said extruded stream a cylinder of the material which is to form the protective coating, passing said protective coating material into a second heating zone, melting said material in said second heating zone at a lower temperature to a temperature sufficient to draw said material into a fiber and drawing it into a fiber so as to form an apex at the point where the fiber is formed, continuously drawing said protective material into a fiber, introducing said molten metal stream, from a point out of contact with said protective material, into said apex of the protective material, said apex being about 1 to 6 inches from the point at which the molten metal is extruded, continuously coating the molten stream with the protective material, continuously drawing a fiber containing a center core of molten metal and an outer coating of protective material at a rate at which the period of time of contact during which said metal and said protective material are molten and in contact and reactive is about 0.5 to 0.002 second, whereby substantially no reaction takes place between said metal and said protective material and cooling said molten metal and said outer covering to solidify said metal core and outer covering.

19. The process of claim 18 wherein said metal consists of boron.

References Cited

UNITED STATES PATENTS 3,214,805   11/1965   McKenica _____ 164—86 X
3,347,959   10/1967   Engelke et al. _____ 164—89 X

FOREIGN PATENTS 859,908   4/1953   Germany.

J. SPENCER OVERHOLSER, Primary Examiner

V. K. RISING, Assistant Examiner

U.S. Cl. X.R.

18—8; 65—3; 164—81, 87, 89